June 19, 1951  W. A. PEASE  2,557,309
TRUSS PAD
Filed June 30, 1949

INVENTOR.
William A. Pease
BY
Wood, Arey, Herron & Evans
ATTORNEYS

Patented June 19, 1951

2,557,309

UNITED STATES PATENT OFFICE 2,557,309

TRUSS PAD

William A. Pease, Cincinnati, Ohio, assignor to Surgical Appliance Industries, Inc., Cincinnati, Ohio, a corporation of Ohio Application June 30, 1949, Serial No. 102,233

2 Claims. (Cl. 128—113)

This invention relates to truss pads of the type used for the treatment and relief of hernia and similar disorders.

A pad of this type usually comprises a body member fabricated from rubber or other similar resilient material which is adapted to be placed on the appropriate location on the body of the patient, being held in position by a truss belt to which it is detachably fastened. The pad is provided with a metal base plate which serves as a mounting for a metallic connector adapted to secure the pad to the truss belt arm.

In the past, two different means of attaching the metal base plate to the rubber pad had been used commercially, but neither have been entirely satisfactory. In some instances, the plate is placed against the flat back of the pad and is held in position by an elastic rubber covering or "skin," stretched around the pad and over the margins of the base plate so as to hold the plate in place. However, this design is expensive since a separate, specially shaped, elastic cover is required in addition to the attendant assembly cost of stretching the cover over the pad and plate. Moreover, the rubber covering does not hold the plate firmly in position on the pad, and during use, the plate tends to slip between the pad and the cover to the extent that it becomes so misadjusted that the pad is uncomfortable to wear.

In place of this construction, it has also been conventional to mold the pad directly into the body member so that it is entirely encased. In most instances, this construction is even more expensive to manufacture than the first construction, since complex equipment and costly molding techniques must be employed. Moreover, it is necessary in order to provide seats in the plate for the connector attachment screws, to drill blindly through the body member and the plate and thereafter tap the drilled holes. If the threaded seats are formed in the plate prior to the molding operation the liquid rubber tends to flow into the holes during molding and clog the seats. While the plate usually does not slip or become misadjusted in this type of pad nevertheless it cannot be removed without destroying the pad. Consequently if the threaded holes in the plate become stripped or if the pad becomes worn, it becomes necessary to discard both the body member and the base plate.

This invention is directed to a truss pad provided with integral means for holding the base plate firmly attached to the pad. The holding means are releasable to permit the plate to be detached from the pad for the purpose of substituting new plates for worn plates or for permitting pads of different shapes and sizes to be attached to the plate. The pad is susceptible to modern low cost manufacturing techniques and may be of one piece construction, in which case the body member is fabricated in its entirety from vulcanized or sponge rubber or some other suitable material, or alternatively, the body can be molded in two or more parts, composed of different materials selected to respectively provide comfort and support to the patient at the point of injury and relative strength and rigidity at the point of connection between the pad and the plate. In either event, it is unnecessary to use an elastic covering to hold the base plate in position, with the consequent result that manufacturing costs, as well as assembly costs, are considerably reduced.

More specifically described, the improved truss pad of this invention comprises a body member fabricated from rubber or similar material which contains a pre-formed seat for the base plate and a flexible retaining skirt or flange integral with the seat and adapted to extend over part of the plate. The juncture between the seat and flange provides a shoulder which, residing adjacent the periphery of the base plate, is effective for limiting its movements from centralized position in any direction. Thus, the skirt not only cooperates with the seat to hold the base plate firmly against accidental detachment but the shoulder prevents undue lateral slippage of the plate relative to the pad. When it is necessary to detach the pad from the plate or attach a pad to the plate the flange is simply turned away from the seat and the plate is removed from or placed in the seat as the case may be. After the desired operation is performed the flange is released and it snaps back into cooperative relationship with the seat.

Another improvement inherent in the present invention results from the concept of providing a specially preformed seat, which is configurated in conformation with a non-planar seating surface formed on the base plate, thus further insuring that relative lateral slippage between the plate and the body member will not occur. This construction represents a substantial advance over prior constructions where flat seats, which did little to prevent slippage, were used.

Other advantages and objectives of the present invention can be ascertained from the following specification and drawings in which.

Figure 1:
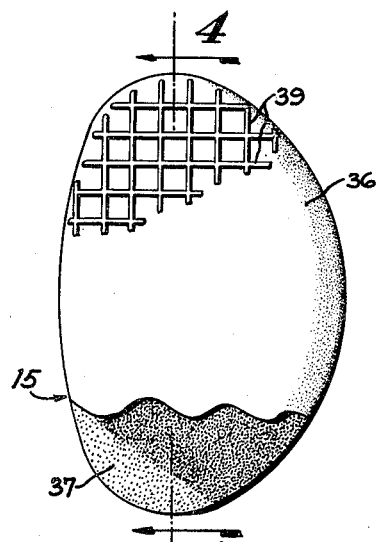
Figure 1 is a front view of a truss pad embodying my invention.

The pad comprises a body member 15 which is fabricated from rubber or similar resilient material. The pad may be provided with an integral head or button, not shown, the construction and usage of which are well known to those skilled in the art. The central portion of the body contains a cavity 17 of the type usually found in this type of pad.

At the back of the pad a recessed seat 18 is provided for a base plate 19. The plate is retained in the seat by means of a flexible skirt or flange formed integrally with the body member 15. As best seen in Fgures 4 and 5, this flange extends over the marginal edgewise portions of the base plate 19 and cooperates with the seat to hold the plate firmly attached to the pad. It will be observed that the seat 18 is circumscribed and bounded by a continuously extending shoulder 20 between the retaining flange and the body member. The shoulder delineates the seat area and, preferably, is dimensioned and contoured to follow and abut the peripheral edges 21 of the base plate, thereby preventing lateral slippage of the plate 19 relative to the seat. If a limited amount of slippage is not objectionable, the shoulder may be dimensioned and contoured to delineate a seat which is slightly larger than the base plate. In either case, slippage is either limited or entirely prevented by the shoulder, and lateral movement of the base plate relative to the seat is stopped as soon as the plate edge contacts the shoulder.

While in the embodiment shown, the retaining flange extends continuously around the seat edge, it is also contemplated that the flange could consist of spaced flexible sections, integral with the body portion at selected points about the periphery of the seat. A sectionalized flange of this type will effectively hold the plate in position, and the section shoulders would also delineate the seat and prevent lateral slippage of the base plate 19.

Figure 5:
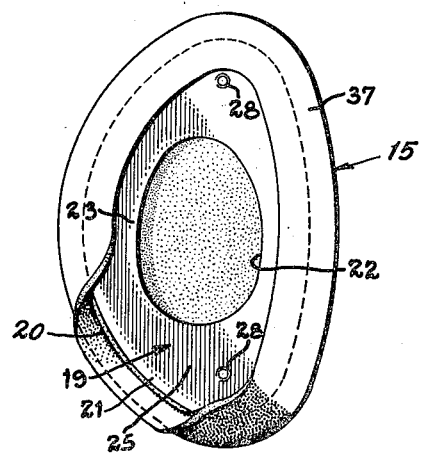
Figure 5 is a rear view similar to Figure 3 but showing the cover plate removed and part of the retaining flange turned back to permit withdrawal of the base plate from the pad.

When it is desired to either remove the base plate from the seat or to place a plate in the seat, part of the retaining flange is simply turned back in the manner indicated in Figure 5. The base plate 19 may then be either removed from, or fitted to, the seat by slipping the plate out from under the other portions of the flange or by slipping the plate underneath the flange, as the case may be. To facilitate handling, the base plate is provided with a central aperture 22 which serves as a finger-hold and permits the base plate to be grasped readily.

In the preferred construction, the plate is configurated to provide angularly projecting lips or legs 23 and 24 which extend around the base plate hole and the outer edge of the base plate, respectively. The edges of these lips contact and bear against the seat and force the main body portion 25 of the plate against the retaining skirt, increasing the frictional resistance therebetween and maintaining a tensional stress on the skirt. Hence, the base plate 19 is made in the form of an arch, the legs of which contact the inner and outer portions of the seat and the span of which is elevated into frictional engagement with the retaining flange. This construction is particularly useful where the distance between the seat and the under-surface of the flange is slightly over-sized or where the retaining lip is fabricated from material which begins to stretch and lose its elasticity under wear. In either of these instances, an absolutely flat plate would reside loosely between the seat and the flange. By virtue of the construction of this invention, the plate is always forced against the retaining flange, even though the material is misdimensioned or has lost some of its resiliency.

Figure 2:
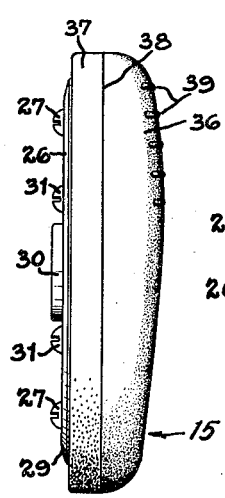
Figure 2 is a side elevational view.
Figure 3:
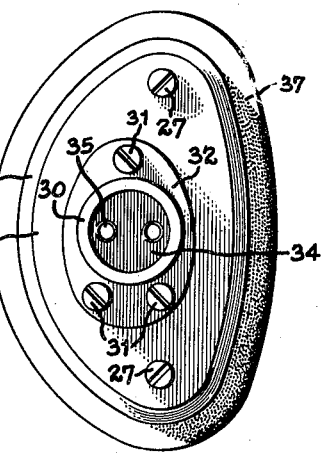
Figure 3 is a rear elevational view of the truss pad.
Figure 4:
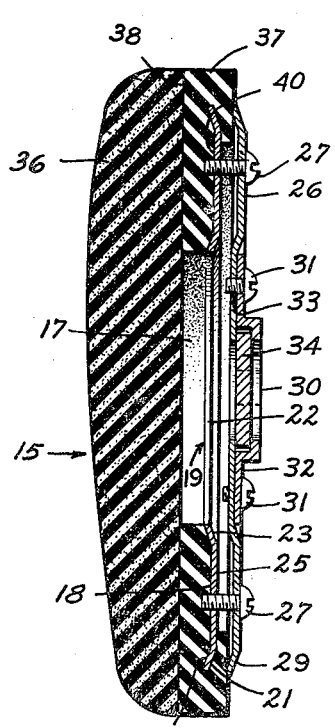
Figure 4 is a sectional view taken along line 4—4 of Figure 1.

In Figures 2, 3 and 4 a preferred form of structure for connecting the pad in the truss belt is shown. A cover plate 26 is detachably fastened to the base plate by means of screws 27 which project into threaded holes 28 formed in the base plate 19. The cover plate 26 may be of the same contour and size as the base plate 19 so that when it is fastened to the base plate, its edgewise portions ovelap the retaining flange in substantial coincidence with the edges of the base plate. It will be observed that if the screws are tightened, the skirt will be clamped between the two plates. If desired, a peripheral flange 29 may be provided on the outside edge of the cover plate 26 to cooperate with the similar flange 21 on the base plate 19 thereby producing a more effective clamping action. It should be noted here that the retaining flange is preferably of substantial thickness to provide sufficient material for the respective plate edges to clamp and compress between them so that even if the screws 27 work loose for one or two thread turns, the resilient rubber of the flange will expand and remain firmly clamped between the edges.

By way of illustration, a typical connection is shown for fastening the pad to the truss belt. A housing 30 is fastened to the cover plate 26 by means of spaced attachment screws 31 which extend through a flange 32 and into threaded holes 33 formed in the cover plate 26. The housing contains a rotatable disc 34 which is provided with screw holes 35 into which may be threaded the screws (not shown) which attach the disc to the truss arm. When the disc is screwed to the truss belt arm in the manner suggested, the pad can be adjusted relative to the truss belt arm at the proper angle and position on the wearer's body. The rotatable connector and its immediate mounting, just described, does not form a part of the present invention and is consequently not described in detail.

The truss pad body of this invention can be formed in several ways. For example, it can be molded as a unitary entity in which the entire body member is made from either sponge rubber or commercial, vulcanized rubber. Alternatively, the body can be made in joined sections, in which instance, the front portion of the body member which contacts the wearer's body can be molded from soft sponge rubber and the back portion of the body can be fabricated from stiffer commercial, vulcanized rubber. In the latter construction, the body contacting section is soft and springy, affording maximum comfort to the wearer, but it is reinforced and supported by the stiffer back section adapted to provide a firm seat and a relatively stiff, plate-retaining flange which is unlikely to be flexed in use to the extent that accidental detachment of the plate occurs.

The recessed seat and the retaining flange may be formed in the body member in any one of a number of ways. For instance, the body member may be formed in a mold adapted to shape the body along the desired lines and the seat and flange later formed by a cutter. Alternatively, a body mold may be provided with an internal form adapted to shape the liquid rubber so that a preformed seat and retaining flange are formed directly in the body during the molding operation. If the seat forming surface of the form is flat, the seat will also be flat, or if it is configured to simulate a non-planar seating surface of a base plate, the seat will conform to the non-planar surface. If it is so desired, the base plate 19 which is to be used with the body member may be substituted in the mold for the previously described mold form. If this is done, the seat and flange will be properly shaped, directly to the base plate with which they will be used.

In the particular embodiment of my invention shown the body is composed of a front or body contacting section 36 fabricated from sponge rubber, and a back section 37 fabricated from vulcanized rubber. These two sections are joined along line 38 by means of rubber cement or any other suitable adhesive. It will be observed, that the front section which comes into contact with the body of the wearer is soft and extremely resilient thus providing increased comfort to the wearer. The outside surface of this portion may be reticulated, as at 39, to increase the frictional resistance to slippage between the wearer's body and the pad. The back section being made of stiffer vulcanized rubber provides a support for the soft front section also providing a relatively stiff retaining flange which is more effective to hold the base plate in position.

The surface of the seat is not flat, but rather is shaped to conform to the non-planar base plate. In the particular embodiment shown, the base plate 19 is of the arch-type configuration previously described, and the central portion 40 of the seat is molded or otherwise formed to fill the span between the arch legs. Hence, the protruding portion of the seat is effective to prevent lateral slippage of the seat, while the base plate 19 is held against the seat. It will be observed that the flange need not press the base plate against the seat so firmly that the seat is actually deformed in order to prevent lateral slippage of the plate. It is sufficient if the plate is just held lightly against the pre-formed seat. The specific configurations of the base plate and seat shown here are representative only, it being understood that the base plate and seat may be of other non-planar configurations without departing from the scope of this invention.

Having described my invention, I claim:

1. In a truss pad, the combination of: a body member fabricated from an elastic, resilient material, a base plate, said body member having a recessed seat for said base plate, said base plate being of arch-type configuration, said seat being configurated into a protuberance adapted to fit within the arch of said base plate, and means for holding said base plate against said seat whereby said seat prevents relative lateral slippage between said plate and said body member.

2. In a truss pad: a body member, said body member comprising a front section and a back section joined together, said front section adapted to contact the patient's body and being fabricated from a relatively soft material, said back section having a preformed seat adapted to receive a base plate and an integral, flexible flange adapted to releasably hold a base plate in said seat, said back section being formed from a resilient material which is relatively stiffer than the material forming said front section, whereby said relatively stiff flange and said relatively stiff seat cooperate to prevent accidental detachment of said base plate and said relatively soft front section is adapted to provide comfortable support for the injured portions of the patient's body.

WILLIAM A. PEASE.

REFERENCES CITED

The following references are of record in the file of this patent:

UNITED STATES PATENTS

| Number | Name | Date |
| --- | --- | --- |
| 947,551 | Fosgate | Jan. 25, 1910 |
| 1,237,709 | Seeley | Aug. 21, 1917 |
| 1,610,813 | Pease | Dec. 14, 1926 |
| 2,070,727 | Hamann | Feb. 16, 1937 |
| 2,108,521 | Bell | Feb. 15, 1938 |
| 2,323,826 | Mason | July 6, 1943 |